(12) United States Patent
Bulea (10) Patent No.: US 8,952,925 B2
(45) Date of Patent: Feb. 10, 2015

(54) SYSTEM AND METHOD FOR DETERMINING RESISTANCE IN AN INPUT DEVICE

(75) Inventor: Mihai Bulea, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 180 days.

(21) Appl. No.: 13/427,202

(22) Filed: Mar. 22, 2012

(65) Prior Publication Data

US 2013/0249850 A1    Sep. 26, 2013

(51) Int. Cl.
*G06F 3/045* (2006.01)

(52) U.S. Cl.
USPC .......................................................... 345/174

(58) Field of Classification Search
None
See application file for complete search history.

(56) References Cited

U.S. PATENT DOCUMENTS

| | | | |
|---|---|---|---|
| 4,087,625 A | 5/1978 | Dym et al. | |
| 5,629,784 A * | 5/1997 | Abileah et al. | 349/112 |
| 5,650,597 A | 7/1997 | Redmayne | |
| 5,841,078 A | 11/1998 | Miller et al. | |
| 6,278,444 B1 | 8/2001 | Wilson et al. | |
| 6,288,707 B1 | 9/2001 | Philipp | |
| 6,825,737 B2 * | 11/2004 | Lohr | 333/24 R |
| 6,879,930 B2 | 4/2005 | Sinclair et al. | |
| 7,030,860 B1 | 4/2006 | Hsu et al. | |
| 7,265,686 B2 | 9/2007 | Hurst | |
| 7,355,592 B2 | 4/2008 | Hong et al. | |
| 7,382,139 B2 | 6/2008 | Mackey | |
| 7,423,635 B2 | 9/2008 | Taylor et al. | |
| 7,737,953 B2 | 6/2010 | Mackey | |
| 7,808,255 B2 | 10/2010 | Hristov et al. | |
| 8,248,383 B2 | 8/2012 | Dews et al. | |
| 2004/0135775 A1 | 7/2004 | Hurst et al. | |
| 2005/0012644 A1 | 1/2005 | Hurst et al. | |
| 2006/0097991 A1 | 5/2006 | Hotelling et al. | |
| 2007/0146349 A1 | 6/2007 | Errico | |
| 2007/0222763 A1 | 9/2007 | Spath | |
| 2007/0247443 A1 | 10/2007 | Philipp | |
| 2007/0257894 A1 | 11/2007 | Philipp | |
| 2008/0006453 A1 | 1/2008 | Hotelling | |
| 2008/0246496 A1 | 10/2008 | Hristov et al. | |
| 2009/0091551 A1 | 4/2009 | Hotelling et al. | |
| 2009/0194344 A1 | 8/2009 | Harley et al. | |
| 2009/0267914 A1 * | 10/2009 | Dews et al. | 345/173 |

(Continued)

OTHER PUBLICATIONS

ISA/KR "International Search Report and Written Opinion" mailed Apr. 28, 2011 for International Appln. No. PCT/US2010/048319.

(Continued)

*Primary Examiner* — William Boddie
*Assistant Examiner* — Bipin Gyawali
(74) *Attorney, Agent, or Firm* — Ingrassia Fisher & Lorenz P.C.

(57) ABSTRACT

A processing system for an input device includes a transmitter module, a receiver module, and a determination module. The transmitter module includes transmitter circuitry and is configured to apply a first differential drive signal across a transmitter electrode to produce a first voltage variation across the transmitter electrode. The receiver module is configured to receive a first resulting signal with a receiver electrode when the first voltage variation is produced across the transmitter electrode. The determination module is configured to determine at least one of a resistance of the transmitter electrode and a resistance of a conductive trace coupled to the transmitter electrode based on the first resulting signal. As a result, an error in the position of an input object can be corrected.

20 Claims, 8 Drawing Sheets

(56) References Cited

U.S. PATENT DOCUMENTS

| | | | |
|---|---|---|---|
| 2009/0277696 A1 | 11/2009 | Reynolds et al. | |
| 2009/0322355 A1 | 12/2009 | Day et al. | |
| 2010/0007625 A1 | 1/2010 | Jiang et al. | |
| 2010/0045632 A1 | 2/2010 | Yilmaz et al. | |
| 2010/0110039 A1* | 5/2010 | Li | 345/174 |
| 2010/0164889 A1* | 7/2010 | Hristov et al. | 345/173 |
| 2010/0214231 A1 | 8/2010 | D'Souza et al. | |
| 2010/0258360 A1 | 10/2010 | Yilmaz | |
| 2010/0328255 A1 | 12/2010 | Ishizaki et al. | |
| 2011/0007028 A1* | 1/2011 | Curtis et al. | 345/174 |
| 2011/0043478 A1 | 2/2011 | Matsushima | |
| 2011/0048813 A1 | 3/2011 | Yilmaz | |
| 2011/0062969 A1 | 3/2011 | Hargreaves et al. | |
| 2011/0062974 A1* | 3/2011 | Day et al. | 324/713 |
| 2011/0267287 A1* | 11/2011 | Bartling et al. | 345/173 |
| 2012/0056841 A1* | 3/2012 | Krenik et al. | 345/174 |
| 2012/0162122 A1* | 6/2012 | Geaghan | 345/174 |

OTHER PUBLICATIONS

USPTO, Ex parte Quayle Office Action for U.S. Appl. No. 12/879,474, mailed May 15, 2013.

United States Patent and Trademark Office, Non-Final Office Action mailed Sep. 6, 2012 for U.S. Appl. No. 12/847,598.

\* cited by examiner

SYSTEM AND METHOD FOR DETERMINING RESISTANCE IN AN INPUT DEVICE

FIELD OF THE INVENTION

This invention generally relates to electronic devices, and more specifically relates to sensor devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers).

Gradient sensors are sensors that employ a voltage variation across one or more electrodes (usually a transmitter electrode) to assist in determining positional information. In many such sensors, the transmitter electrodes and/or sensor electrodes are communicatively coupled to associated circuitry via one or more conductive traces, electro-mechanical bonds, and the like, each having their own associated electrical resistance. The resistance introduced by conductive traces in series with the sensor electrodes are often unknown and can be significant. Accordingly, there is a need for systems and methods capable of determining the resistance of conductive traces in input devices.

BRIEF SUMMARY OF THE INVENTION

A processing system in accordance with one embodiment includes a transmitter module, a receiver module, and a determination module. The transmitter module includes transmitter circuitry and is configured to apply a first differential drive signal across a transmitter electrode to produce a first voltage variation across the transmitter electrode. The receiver module is configured to receive a first resulting signal with a receiver electrode when the first voltage variation is produced across the transmitter electrode. The determination module is configured to determine at least one of a resistance of the transmitter electrode and a resistance of a conductive trace coupled to the transmitter electrode based on the first resulting signal.

A capacitive sensor device in accordance with one embodiment comprises a transmitter electrode, a conductive trace coupled to the transmitter electrode, a receiver electrode, and a processing system communicatively coupled to the transmitter electrode and the receiver electrode. The processing system is configured to: apply a first differential drive signal across the transmitter electrode to produce a first voltage variation across the transmitter electrode; receive with the receiver electrode a first resulting signal when the first voltage variation is produced across the transmitter electrode; and determine at least one of a resistance of the transmitter electrode and a resistance of the conductive trace based on the first resulting signal.

In accordance with another embodiment, a method of determining resistances in an input device having a transmitter electrode and a conductive trace coupled thereto includes: applying a first differential drive signal across a transmitter electrode to produce a first voltage variation across the transmitter electrode; receiving with a receiver electrode a first resulting signal comprising effects of the first voltage variation when the first voltage variation is produced across the transmitter electrode; and determining at least one of a resistance of the transmitter electrode and a resistance of the conductive trace based on the first resulting signal.

BRIEF DESCRIPTION OF DRAWINGS

The present invention will hereinafter be described in conjunction with the appended drawings, where like designations denote like elements, and.

DETAILED DESCRIPTION OF THE INVENTION

The following detailed description presents a number of example embodiments and is not intended to limit the invention or the application and uses of the invention. Furthermore, there is no intention to be bound by any expressed or implied theory presented in the preceding technical field, background, brief summary, or the following detailed description.

Figure 1:
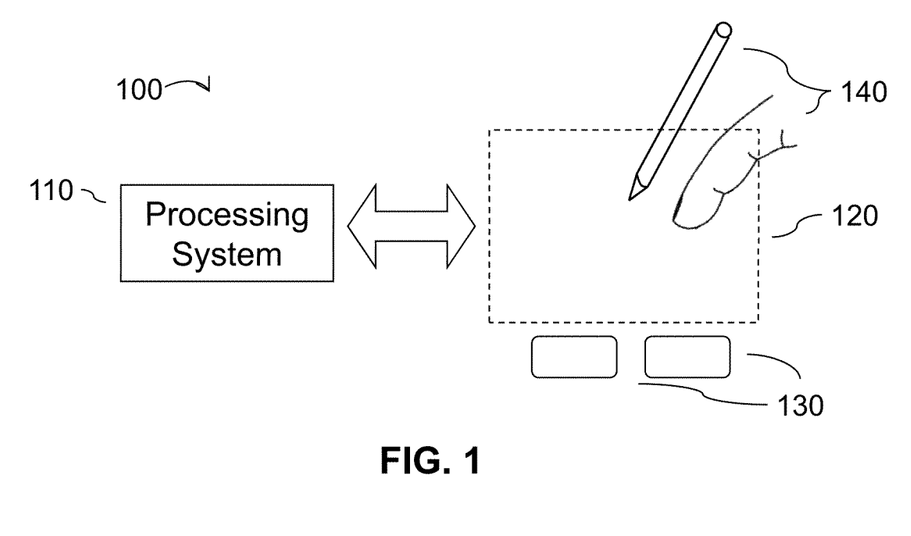
FIG. 1 is a block diagram of an example system that includes an input device in accordance with an embodiment of the invention.

Various embodiments of the present invention provide input devices and methods that facilitate improved usability. FIG. 1 is a block diagram of an example input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be substantially uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Figure 2A:
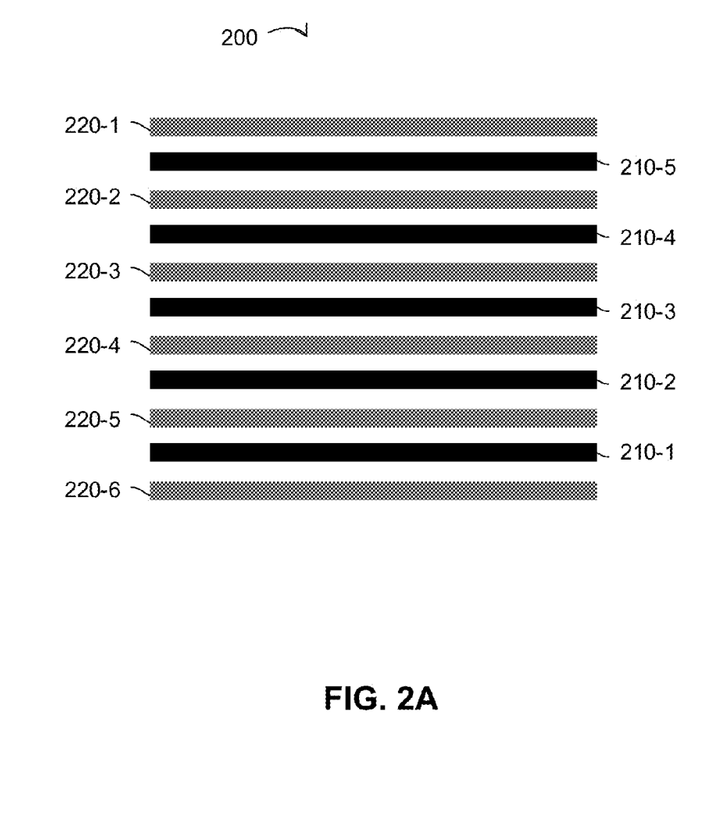
FIG. 2A is a conceptual block diagram depicting an example electrode pattern.
Figure 2B:
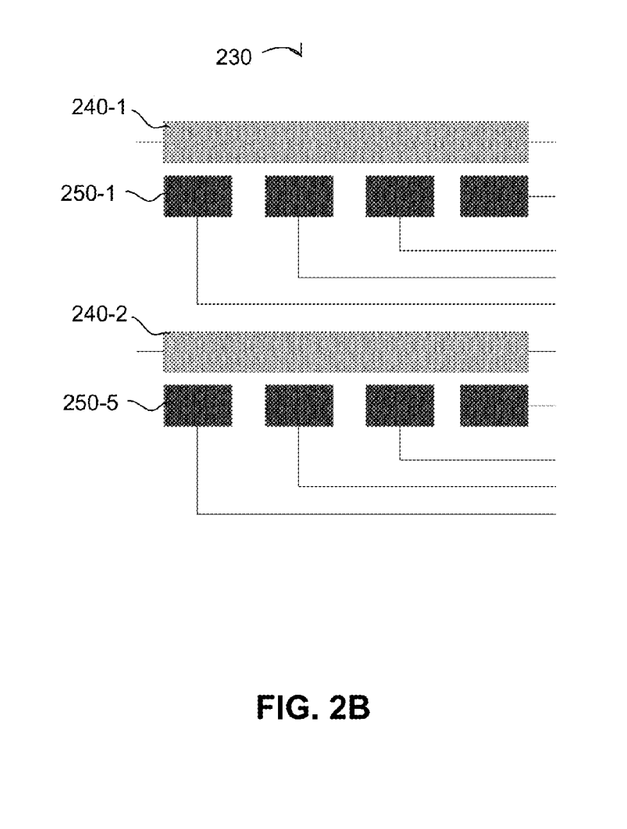
FIG. 2B is a conceptual block diagram depicting an example electrode pattern.
Figure 2C:
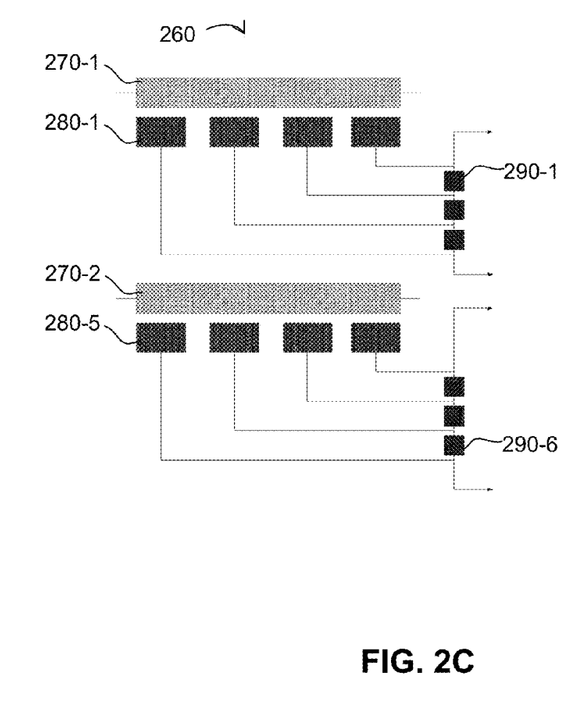
FIG. 2C is a conceptual block diagram depicting an example electrode pattern.
Figure 3:
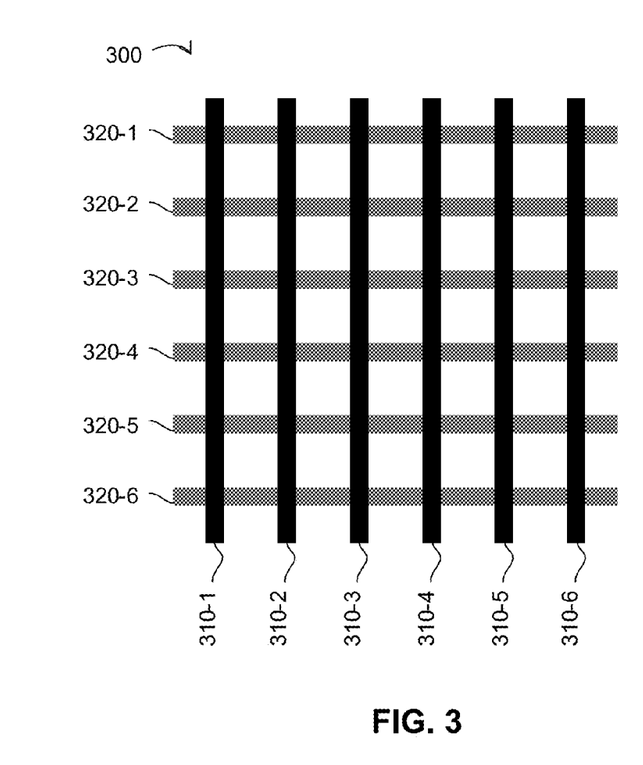
FIG. 3 is a conceptual block diagram depicting an example electrode pattern.

FIGS. 2A-C and 3 illustrate, conceptually, example sets of capacitive sensor electrodes configured to sense in a sensing region. For clarity of illustration and description, FIGS. 2A-C shows patterns of sensor electrodes arranged substantially parallel to each other, and FIG. 3 shows a pattern of sensor electrodes arranged substantially perpendicular to each other. FIGS. 2A-C and FIG. 3 illustrates different forms of what may be referred to as "gradient" sensors, in which a voltage variation is produced in the electrodes, as described in further detail below. The embodiments illustrated in FIGS. 2B-C and FIG. 3 may further be referred to as an "image" sensor, or a "gradient image sensor." The term "gradient sensor" is thus used herein, without loss of generality, to refer to a sensor device employing one or more such voltage variations as described herein. It will be appreciated, however, that the invention is not so limited, and that a variety of electrode patterns and shapes may be suitable in any particular embodiment.

The sensor electrodes of FIGS. 2A-C and FIG. 3 are typically ohmically isolated from each other. According to various embodiments, the sensor electrodes can be located in a single layer or can be separated by one or more substrates. For example, they may be disposed on opposite sides of the same substrate, or on different substrates that are laminated together.

The capacitive coupling between the transmitter electrodes and receiver electrodes change with the proximity and motion of input objects in the sensing region associated with the transmitter electrodes and receiver electrodes. In the embodiment depicted in FIG. 2A, some sensor electrodes 210 (e.g., 210-1, 210-2, etc.) are configured as receiver electrodes, and some sensor electrodes 220 (e.g., 220-1, 220-2, etc.) are configured as transmitter electrodes. In an embodiment depicted in FIG. 2B, some sensor electrodes 250 (e.g., 250-1, 250-2, etc.) are configured as receiver electrodes, and some sensor electrodes 240 (e.g., 240-1, 240-2, etc.) are configured as transmitter electrodes.

In addition, in an embodiment depicted in FIG. 2C, some sensor electrodes 270 (e.g., 270-1, 270-2, etc.) are configured as receiver electrodes, and some sensor electrodes 280 (e.g., 280-1, 280-2, etc.) are configured as transmitter electrodes. In this embodiment, a voltage gradient can be produced between transmitter electrodes 280 by providing resistive elements 290 (e.g., 290-1, 290-2, etc.) to form a voltage divider such that a different voltage is provided to each transmitter electrode 280. In an embodiment depicted in FIG. 3, some sensor electrodes 310 (e.g., 310-1, 310-2, etc.) are configured as receiver electrodes, and some sensor electrodes 320 (e.g., 320-1, 320-2, etc.) are configured as transmitter electrodes. In many embodiments, transmitter electrodes and/or receiver electrodes are communicatively coupled to associated circuitry via one or more conductive traces, electro-mechanical bonds, and the like (not shown). Each conductive trace and/or bond has an associated, non-zero resistance, as described in further detail below.

In each of the illustrated embodiments (as well as other example embodiments) the receiver sensor electrodes may be operated singly or multiply to acquire resulting signals. The resulting signals may be used to determine a "capacitive frame" representative of measurements of the capacitive couplings. Multiple capacitive frames may be acquired over multiple time periods, and differences between them used to derive information about input in the sensing region. For example, successive capacitive frames acquired over successive periods of time can be used to track the motion(s) of one or more input objects entering, exiting, and within the sensing region.

Referring again to FIG. 1, a processing system 110 is shown as part of the input device 100. The processing system 110 is configured to operate the hardware of the input device 100 (including, for example, the various sensor electrodes in FIGS. 2A-C and FIG. 3) to detect input in the sensing region 120. The processing system 110 comprises parts of or all of one or more integrated circuits (ICs) and/or other circuitry components. For example, as described in further detail below, a processing system for a mutual capacitance sensor device may comprise transmitter circuitry configured to transmit signals with transmitter sensor electrodes, and/or receiver circuitry configured to receive signals with receiver sensor electrodes).

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes determination circuitry configured to determine positional information for an input device based on the measurement.

"Positional information" as used herein broadly encompasses absolute position, relative position, velocity, acceleration, and other types of spatial information. Example "zero-dimensional" positional information includes near/far or contact/no contact information. Example "one-dimensional"

positional information includes positions along an axis. Example "two-dimensional" positional information includes motions in a plane. Example "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 4:
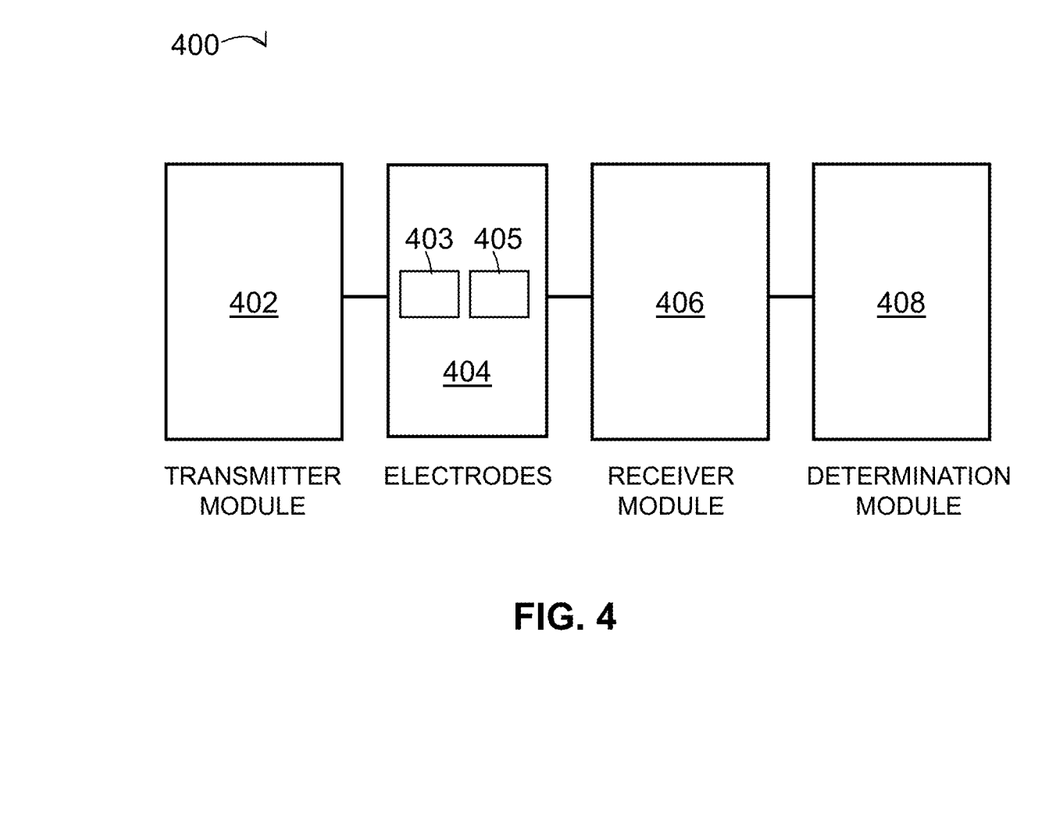
FIG. 4 is a conceptual diagram depicting an example processing system in accordance with the present invention.

Referring now to the conceptual block diagram depicted in FIG. 4, various embodiments of an example processing system 110 as shown in FIG. 1 may include a system 400. System 400, as illustrated, generally includes transmitter module 402 communicatively coupled via a set of sensor electrodes 404 to receiver module 406, which itself is coupled to determination module 408. Sensor electrodes 404 include one or more transmitter electrodes 403 and one or more receiver electrodes 405. In one embodiment, sensor electrodes 404 may be constructed from opaque or substantially opaque conductive materials. In other embodiments sensor electrodes 404 can be constructed from transparent or substantially transparent conductive material, such as patterned ITO, ATO, carbon fiber nanotubes, or other substantially transparent materials. In one embodiment, transmitter electrodes 403 are constructed from a conductive material of substantially uniform resistivity, so that voltage variations can be imposed on it by the driving methods described below. In some embodiments, the conductive material may have non-uniform resistivity, such as having a higher or lower resistivity on the distal ends than in the middle portion. Other forms of non-uniform resistivity can also be implemented. In one embodiment, the voltage variations may be defined as the amount of change in voltage as a function of a small change in position along a transmitter electrode comprising resistive material. In practical embodiments, sensor electrodes 404 may be accompanied by (and coupled to) various conductive traces, electro-mechanical bonds, and the like (not shown).

In general, transmitter module 402 includes any combination of software and/or hardware (e.g., transmitter circuitry) configured to apply a first differential drive signal across a transmitter electrode 403 to produce a first voltage variation across the transmitter electrode. According to various embodiments, applying a differential signal across a transmitter electrode 403 can comprise applying a first signal at a first end of a transmitter electrode 403 and applying a second signal at a second end of transmitter electrode 403, such that a voltage difference exists between the first and second ends of transmitter electrode 403. According to various embodiments, the first and second signals can be substantially constant, varying, codes, orthogonal frequency multiplexed, or time division multiplexed, for example.

Receiver module 406 includes any combination of software and/or hardware (e.g., receiver circuitry) configured to receive a first resulting signal with a receiver electrode 405 when the first voltage variation is produced across a transmitter electrode 403, and determination module 408 includes any combination of hardware and/or software configured to determine, based on the first resulting signal, the resistance of a transmitter electrode 403 and/or a resistance of a conductive trace (not shown) coupled to that transmitter electrode. It should also be noted that "impedance" can be used interchangeably with "resistance."

Figure 5A:
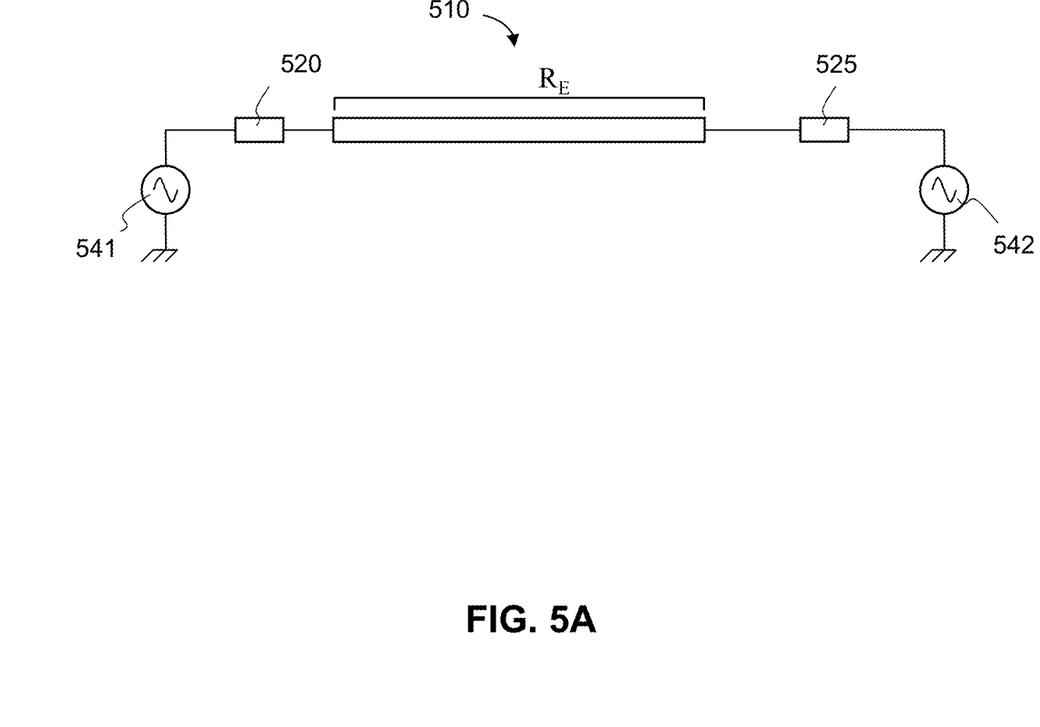
FIG. 5A is a conceptual block diagram of an electrical model useful in describing an embodiment of the present invention.

Referring now to the simplified block diagram depicted in FIG. 5A, the transmitter circuitry and transmitter electrodes of an input device may be modeled, in part, as shown. In this model, differential drive signals are applied across one or more transmitter electrodes 510 by transmitters 541 and 542, which are communicatively coupled to opposite ends of transmitter electrodes 510 through various resistive elements 520 and 525. Transmitters 541 and 542 may comprise any combination of hardware and software configured to produce differential drive signals as described herein.

In the illustrated embodiment, transmitter 541 is coupled to transmitter electrode 510 through series resistance 520, and transmitter 542 is coupled to transmitter electrode 510 through series resistances 525. Series resistances 520 and 525 can comprise any electrical resistance including, for example, driver resistances (i.e., the resistance inherent to the drivers themselves), "bonding resistances" (i.e., resistances resulting from the bonding of one component to another, such as anisotropic conductive film (ACF) bonding), conductive "trace resistance" (i.e., the resistance associated with one or more conductive traces), and any combination thereof.

Transmitter electrodes 510 themselves are characterized by an effective resistance $R_E$, and may be a substantially uniform resistive material, non-uniform resistive material, or may include geometrical features (narrow cross-sectional regions, or the like) that give rise to various shapes and amplitudes of voltage gradients, discussed in further detail below.

The position of an input object laterally along transmitter electrodes 510 may be determined based on the local change in capacitance induced by the proximity of the input object, since at any particular time the nature of the voltage gradient is known. However, in many embodiments the voltage variations produced across transmitter electrodes 510 will generally diverge from expected voltage variations if series resistances 520 and 525 are not zero. This effect is shown, qualitatively, by the plot depicted in FIG. 6 and is described in further detail with respect to FIG. 5B.

Figure 5B:
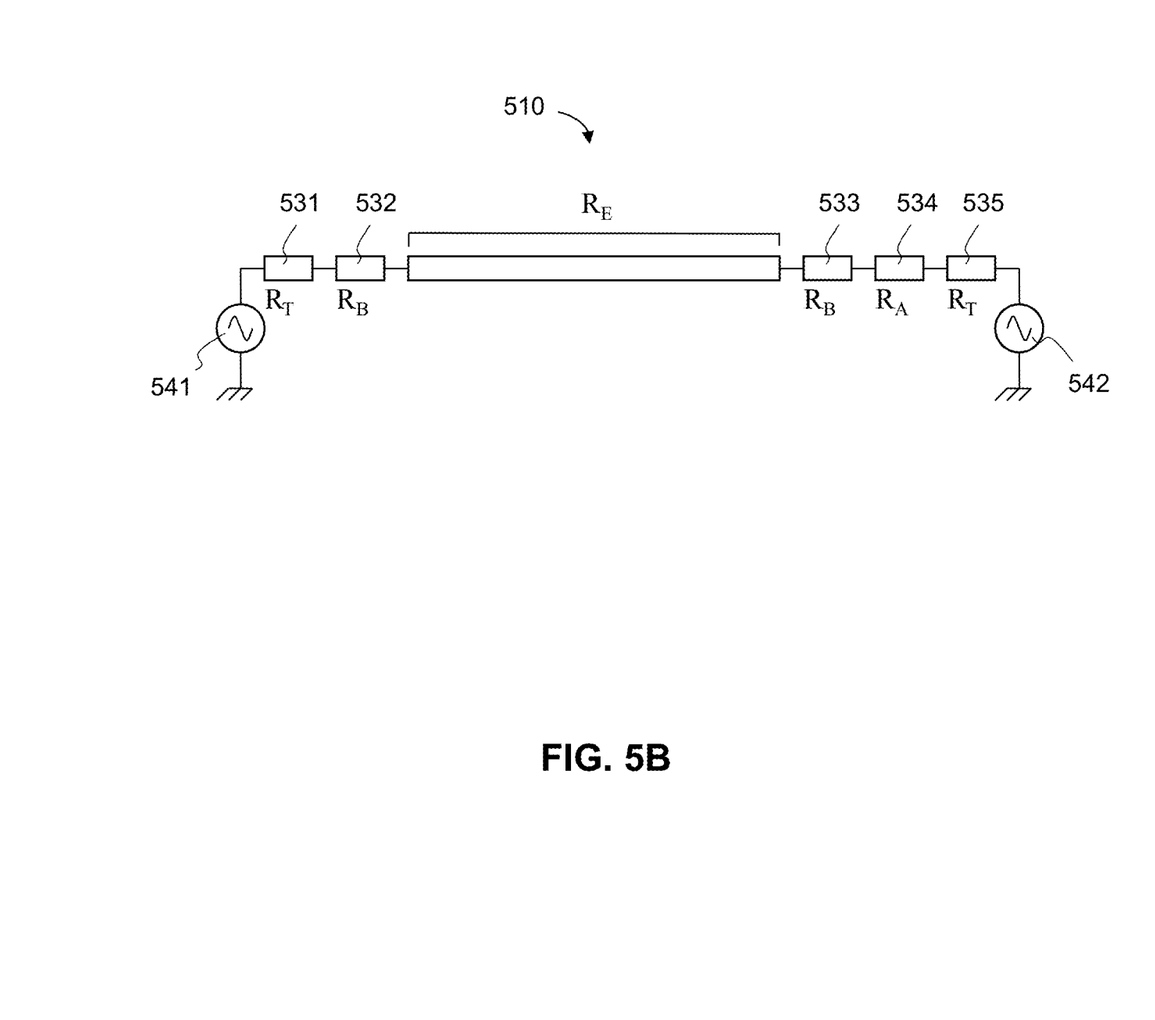
FIG. 5B is a conceptual block diagram of an electrical model useful in describing an embodiment of the present invention.

Referring now to the simplified block diagram depicted in FIG. 5B, the transmitter circuitry and transmitter electrodes of an input device may be modeled, in part, as shown. In this model, series resistance 520 is represented by driver resistances, $R_T$, 531 and bonding resistance, $R_B$, 532. Furthermore, series resistance 525 is represented by driver resistances, $R_T$, 535; bonding resistances, $R_B$, 533; and conductive "trace resistance" $R_A$, 534 (i.e., the resistance associated with one or more conductive traces). In other embodiments series resistances 520 and 525 may comprise other resistances in place of or in addition to any of the above.

While in many embodiments the values of $R_B$ and $R_T$ are relatively small, and known, the value of $R_A$ is typically unknown and can be relatively large compared to electrode resistance $R_E$. As a result, the voltage variations produced across transmitter electrodes 510 will generally diverge from expected voltage variations, as shown by the plot depicted in FIG. 6, in which the x-axis represents the distance along a transmitter electrode (not shown) normalized such that one end corresponds to zero, and the opposite end corresponds to 1.0. The y-axis corresponds to an amplitude (e.g., a voltage value) at that point along the transmitter electrode.

Figure 6:
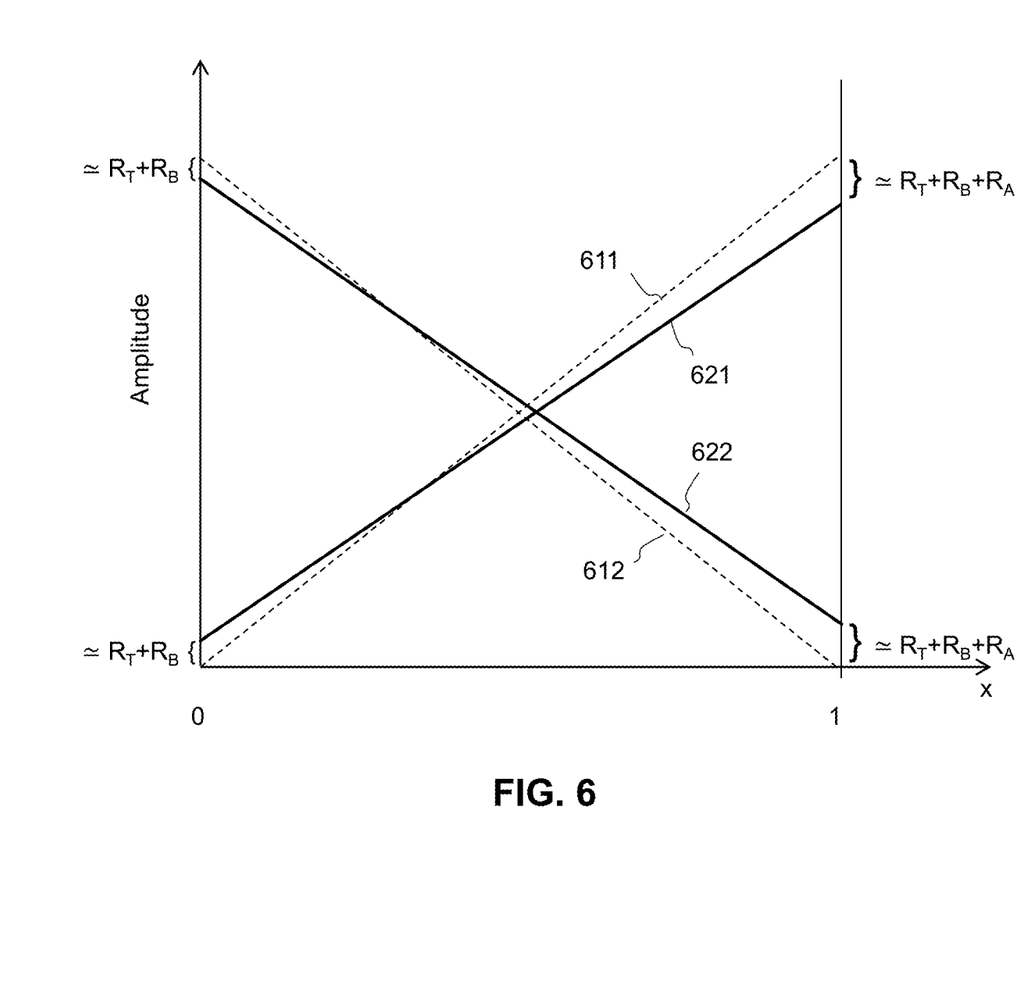
FIG. 6 is a graph depicting voltage variations produced in accordance with an embodiment of the invention.

In FIG. 6, voltage variations 611 and 612 represent an "ideal" case in which the series resistance values 520 and 525 (of FIG. 5A) are substantially zero. Voltage variation 611 is produced by a first differential drive signal applied across the transmitter electrode in an ideal case, and voltage variation 612 is produced by a second differential drive signal applied across the transmitter electrode in an ideal case. Alternatively, voltage variations 611 and 612 are produced by different portions of the same differential drive signal in an ideal case.

Voltage variations 621 and 622, however, illustrate an embodiment in which the series resistance values are non-zero under the same differential drive conditions. As can be seen, voltage variations 621 and 622 are skewed with respect to ideal voltage variations 611 and 612, respectively, such that their amplitudes at x=0 are offset by the value of series resistance 520 (e.g., $R_T + R_B$ in an embodiment). Furthermore, their amplitudes at x=1.0 are offset by the value of series resistance 525 (e.g., $R_T + R_B + R_A$ in an embodiment). During operation, when an input object interacts at a particular distance x along the transmitter electrode, the amplitude values (used to determine positional information) will also reflect these skewed voltage variations. While the voltage variations in FIG. 6 are depicted as linear functions, the invention is not so limited. Voltage variations may be non-linear, piecewise linear, smooth (differentiable), non-smooth, or characterized by any other desired mathematical function.

Referring again to FIGS. 4 and 5A-B, in accordance with one embodiment, determination module 408 is configured to determine the resistance of transmitter electrodes 510 ($R_E$) and/or conductive trace resistance 534 ($R_A$) based on one or more resulting signals associated with one or more differential drive signals applied across transmitter electrodes 510. In an embodiment, determination module 408 may be further configured to determine a series resistance comprising additional resistive elements coupled in series with the transmitter electrode based on one or more resulting signals associated with one or more differential drive signals applied across transmitter electrodes 510. In one embodiment, determination module 408 is configured to determine a resistance based on a single resulting signal (produced by a single differential drive signal). In another embodiment, determination module 408 is configured to determine a resistance based on two resulting signals, for example, produced by two differential drive signals.

In this regard, "applying" a differential drive signal across transmitter electrode 510 refers to driving (e.g., simultaneously) on one or more ends of transmitter electrodes 510 by imparting or otherwise causing a series of bursts, pulses or voltage transitions for a period of time. For example, during a first a differential drive signal, the first end of the transmitter electrode may be driven with a substantially constant voltage (e.g., system ground or any other substantially constant voltage) while the second end is driven with a particular drive signal, and during a second differential drive signal, the second end of the transmitter electrode may be driven with a substantially constant voltage (e.g., system ground or any other substantially constant voltage) while the first end is driven with a particular drive signal.

In one embodiment, the values of $R_A$ and $R_E$ are determined by assuming that the bonding resistance $R_B$ is negligible, and then finding the ratio of two resulting signals to estimate the resistances. For example, in one embodiment, a resulting signal is associated with the area of a voltage variation across a transmitter electrode (referred to as a total capacity $C_T$) which is a measurement of the capacitive coupling between the transmitter and receiver electrodes. In an embodiment, a first resulting signal is associated with the area under voltage variation 621 and a second resulting signal is associated with the area under voltage variation 622. In an embodiment, the values of $R_A$ and $R_E$ can be determined based on first, second, third and fourth resulting signals. The first and second resulting signals are associated with a differential drive signal having a first strength and the third and fourth resulting signals are associated with a differential drive signal having a second strength. The ratio between the first and second resulting signals and the ratio between the third and fourth resulting signals is used to form a system of equations to determine $R_A$ and $R_E$.

Once $R_A$ and $R_E$ are determined, it is possible to compensate for the offset between actual voltage variations 621 and 622 with respect to ideal voltage variations 611 and 612. According to various embodiments, voltage variations 621 and 622 are used to characterize and/or adjust measured resulting signals. Further, in various embodiments, errors in the positional information of an input object are minimized. In yet other embodiments, structural issues or faults within the conductive routing trace and/or transmitter electrode may be determined.

As one specific example, assume that $\Phi_0$ is defined as the ratio of a total capacity $C_T$ associated with a first resulting signal and a second resulting signal, such that:

$$\Phi_0 = \frac{C_T^{(P0)}}{C_T^{(P1)}} = \frac{R_E + 2(R_T - R_B)}{R_E + 2(R_T + R_B) + 2R_A} \quad (9)$$

Assuming that the bonding resistance $R_B$ is very small, this ratio can be approximated as:

$$\Phi_0 = \frac{R_E + 2R_T}{R_E + 2R_T + 2R_A} \quad (10)$$

The output resistance of the transmitter driver, $R_T$, is typically known, so equation 10 provides a first relationship between the transmitter electrode resistance and the trace resistance. In one embodiment, the conductive trace resistance is known, so the transmitter electrode resistance can be determined as:

$$R_E = 2\frac{\Phi_0}{1-\Phi_0}R_A - 2R_T \quad (11)$$

In another embodiment, conductive trace resistance $R_A$ is unknown, so a second differential drive signal having an amplitude different than the first differential drive signal is employed. In one embodiment, the "strength" of the transmitter is changed to generate the second differential drive signal. In such embodiments, the output resistance of the transmitter driver may multiplied by an known factor $\alpha$. For example, in an embodiment, it is possible to select the output resistance of the transmitter driver $R_T$. In other embodiments, the amplitude of the second differential drive signal may be generated in other ways, such that the amplitude is changed by a known amount. According to an embodiment, $R_T$ can comprise a plurality of transistors connected in parallel with one another such that $R_T$ can be changed by a known and controllable quantity by activating a different numbers of transistors. In an embodiment, different transmitter strengths can be provided, for example, by placing additional resistances in series or parallel with one or more of $R_A$, $R_B$, or $R_E$.

By applying the second differential drive signal, a second ratio can be determined as:

$$\Phi_1 = \frac{\tilde{C}_T^{(P0)}}{\tilde{C}_T^{(P1)}} = \frac{R_E + 2\alpha R_T}{R_E + 2\alpha R_T + 2R_A} \quad (12)$$

Equations (10) and (12) provide a system of two equations with two unknowns, $R_A$, $R_E$:

$$\begin{cases} R_A - \left(\frac{1-\Phi_0}{2\Phi_0}\right)R_E = \left(\frac{1-\Phi_0}{\Phi_0}\right)R_T \\ R_A - \left(\frac{1-\Phi_1}{2\Phi_1}\right)R_E = \alpha\left(\frac{1-\Phi_1}{\Phi_1}\right)R_T \end{cases} \quad (13)$$

Solving, trace resistance $R_A$ and the transmitter electrode resistance $R_E$ can be determined as:

$$\begin{cases} R_A = \frac{(\alpha-1)(1-\Phi_0)(1-\Phi_1)}{\Phi_1 - \Phi_0}R_T \\ R_E = 2\frac{\alpha\Phi_0(1-\Phi_1) - \Phi_1(1-\Phi_0)}{\Phi_1 - \Phi_0}R_T \end{cases} \quad (14)$$

In embodiments employing more than one differential drive signal, the differential drive signals may vary from one another in a number of ways. In one embodiment, as described above, the differential drive signals have different strengths (e.g., "amplitudes"). In one embodiment, a first end of transmitter electrodes 510 is driven with a first drive signal having a first polarity while a second end of transmitter electrodes 510 is driven with a second drive signal having a second polarity, wherein the first polarity is different from the second polarity. In another embodiment, the first and second drive signals are mathematically independent of each other.

As used herein, the term "mathematically independent" may refer to signals that provide meaningful independent results. For example, drive signals may exhibit zero or low cross-correlation. That is, drive signals may be considered "mathematically independent" even if the cross-correlation of the signals is not strictly zero, as long as the signals provide meaningful independent results. In one embodiment, the mathematically independent drive signals are orthogonal to each other. In other embodiments, the mathematically independent drive signals are substantially orthogonal to each other. In some embodiments, the drive signals are mathematically independent in phase, as might be implemented in phase modulation (PM) systems. In some embodiments, the drive signals are mathematically independent in frequency. Examples include various frequency modulation (FM) schemes, such as orthogonal frequency-division-multiplexing (OFDM). In other embodiments, the drive signals are mathematically independent in code. In one embodiment, code divisional multiple access (CDMA) is implemented. In one embodiment, for example, the drive signals are pseudo-random sequence codes. In other embodiments, Walsh-Hadamard codes, m-sequence codes, Gold codes, Kasami codes, Barker codes, or other appropriate quasi-orthogonal or orthogonal codes are used.

Figure 7:
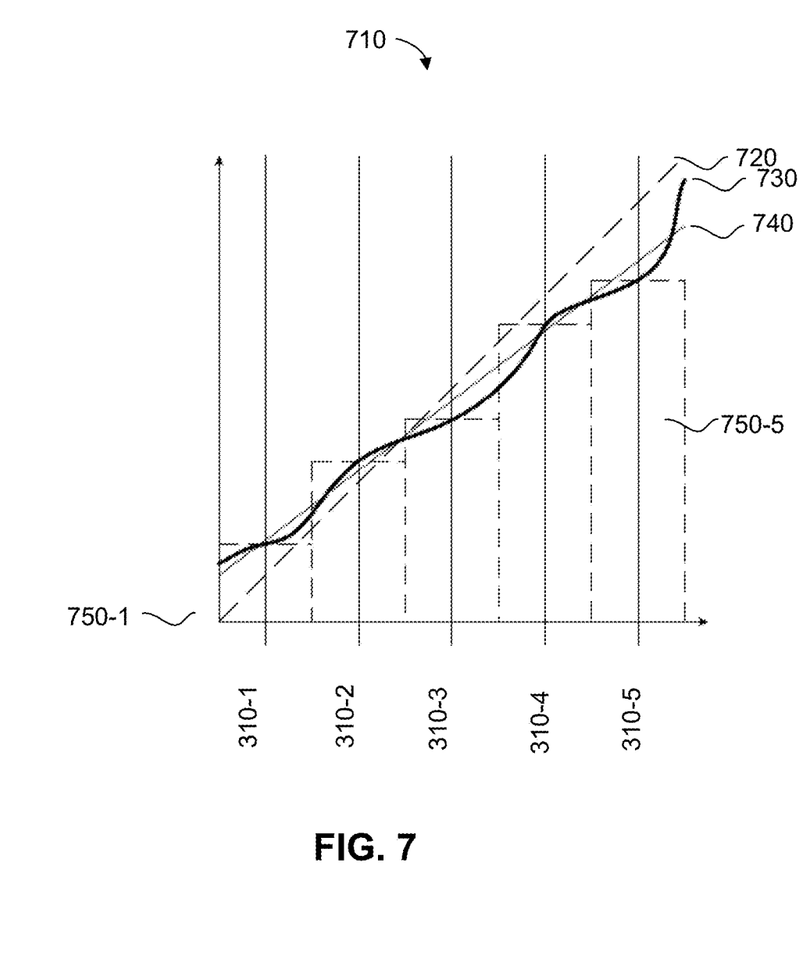
FIG. 7 is a graph depicting voltage variations produced in accordance with an embodiment of the invention.

FIG. 7 shows a general case of a voltage variation 730 for an imaging gradient sensor. The vertical offset and approximate slope of "measured" voltage variation 730 is different than "ideal" voltage variation 720 because resistances 520 and 525 are non-zero in general (see FIG. 5A). In an embodiment, the imaging gradient sensor comprises multiple receivers 310, each of which measures a capacity in the region of a respective receiver (e.g., as illustrated by elements 750). Using the values measured by receivers 310 it is possible to determine the slope of voltage variation 730, as illustrated by curve 740. According to various embodiments, curve 740 is fitted to produce an approximation to voltage variation 730 by using statistical methods, such as linear regression.

The value of transmitter resistance $R_E$ can be determined (and thus errors in detecting the position of an input object) by calculating the ratio between two different slopes of voltage variation 740 associated with two differential drive signals having different transmitter strengths. For example, the slope of voltage variation 740 can be determined by measuring a resulting signals for each receiver 310 for a first differential drive signal when driver resistances 531 and 535 are set to a low resistance state.

Additionally, another slope of voltage variation 740 can be determined by measuring a resulting signal for each receiver 310 for a second differential drive signal when one of driver resistances 531 and 535 is high and the other is low. Also, by determining the vertical offset of the "actual" voltage variation 740 from "ideal" voltage variation 720 it is possible to further determine $R_A$. For example, the value measured by receiver 310-1 can provide an approximation of the vertical offset at position 0, and receiver 310-5 can provide an approximation of the vertical offset at position 1 (see FIG. 6). The differences between these offsets give a measurement of $R_A$.

According to an embodiment, the accuracy with which transmitter resistance $R_E$ is determined can be improved by determining a baseline (or baseline measurement) based on resulting signals which are received when no input object is in sensing region 120. The baseline allows non-uniformities between receivers 310 (e.g., due to differences in resistance or sensitivity) to be removed by subtracting the baseline from other resulting signals. For example, in an embodiment, a baseline is determined by applying a third differential drive signal when driver resistances 531 and 535 are set to a high resistance state. A resulting signal is measured for each receiver 310. These resulting signals can be subtracted from the resulting signals measured by receivers 310 for the first and second different differential drive signals. Alternatively, the slope of the resulting singles can be calculated and then subtracted from the slopes of the voltage variations associated with the first and second differential drive signals.

More specifically, in an embodiment, a first end of transmitter electrode 510 is driven with a substantially constant voltage, a second end of transmitter electrode 510 is driven with a first drive signal, and the output resistance of one or both of the two transmitters (541 and 542) is changed. For example, the output resistance may include the following three settings: (a) low output resistance for both transmitters, (b) low resistance for one transmitter, and high resistance for the other, and (c) high output resistance for both transmitters. Assuming that $R_B$ and $R_A$ are negligible, the respective excitation levels at the ends (designated "R" and "L") of the transmitter electrode for these three settings are as follows:

$$E_L^{(0)} = \frac{R_T}{R_E + 2R_T} \quad E_R^{(0)} = \frac{R_E + R_T}{R_E + 2R_T} \quad (15)$$

$$E_L^{(1)} = \frac{\alpha R_T}{R_E + (1+\alpha)R_T} \quad E_R^{(1)} = \frac{R_E + \alpha R_T}{R_E + (1+\alpha)R_T}$$

$$E_L^{(2)} = \frac{\alpha R_T}{R_E + 2\alpha R_T} \quad E_L^{(2)} = \frac{R_E + \alpha R_T}{R_E + 2\alpha R_T}$$

The excitation functions are linear, and their slopes, in terms of a width W, are given by:

$$S^{(0)} = \frac{E_R^{(0)} - E_L^{(0)}}{W} \quad (16)$$

$$S^{(1)} = \frac{E_R^{(1)} - E_L^{(1)}}{W}$$

$$S^{(2)} = \frac{E_R^{(2)} - E_L^{(2)}}{W}$$

In accordance with one aspect of this embodiment, a baseline value can be utilized to substantially eliminate the effect of non-uniformities. If the baseline is set to the response for the third case—i.e., high output resistance for both transmitters—then the baseline slopes of the excitation functions ($S_B$) can be expressed as:

$$S_B^{(0)} = \frac{(E_R^{(0)} - E_R^{(2)}) - (E_L^{(0)} - E_L^{(2)})}{W} \quad (17)$$

$$S_B^{(1)} = \frac{(E_R^{(1)} - E_R^{(2)}) - (E_L^{(1)} - E_L^{(2)})}{W}$$

where their ratio is given by:

$$k = \frac{S_B^{(0)}}{S_B^{(1)}} = \frac{(E_R^{(0)} - E_R^{(2)}) - (E_L^{(0)} - E_L^{(2)})}{(E_R^{(1)} - E_R^{(2)}) - (E_L^{(1)} - E_L^{(2)})} \quad (18)$$

If equation 15 is substituted into equation 18, and then simplified, it can be shown that:

$$\frac{R_E}{R_T} = 2\frac{(1+\alpha)-k}{k-2} \quad (19)$$

As mentioned above, the value of $R_T$ and $\alpha$ are known. Furthermore, the value of k (the ratio of the two slopes) can be computed from observed data by fitting a line to each of the two responses (i.e., after determining the baseline with no input object within the sensing region). Accordingly, transmitter electrode resistance, $R_E$, can be determined.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system for an input device, the processing system comprising:
    a transmitter module including transmitter circuitry, the transmitter module configured to apply a first differential drive signal across a transmitter electrode to produce a first voltage variation across the transmitter electrode;
    a receiver module, the receiver module configured to receive a first resulting signal with a receiver electrode when the first voltage variation is produced across the transmitter electrode; and
    a determination module configured to determine at least one of a resistance of the transmitter electrode and a resistance of a conductive trace coupled to the transmitter electrode based on the first resulting signal;
    wherein applying the first differential drive signal comprises:
    substantially simultaneously driving a first end of the transmitter electrode with a first drive signal and driving a second end of the transmitter electrode with a second drive signal.

2. The processing system of claim 1, wherein the transmitter module is further configured to apply a second differential drive signal across the transmitter electrode to produce a second voltage variation across the transmitter electrode, wherein
    the receiver module is further configured to receive a second resulting signal when the second voltage variation is produced across the transmitter electrode, and wherein
    the determination module is further configured to determine at least one of the resistance of the transmitter electrode and the resistance of the conductive trace coupled to the transmitter electrode based on the second resulting signal.

3. The processing system of claim 2, wherein the transmitter module is further configured to apply a third differential drive signal across the transmitter electrode to produce a third voltage variation across the transmitter electrode, wherein
    the receiver module is configured to receive a third resulting signal when the third voltage variation is produced across the transmitter electrode, and wherein
    the determination module is further configured to determine at least one of the resistance of the transmitter electrode and the resistance of the conductive trace coupled to the transmitter electrode based on the third resulting signal.

4. The processing system of claim 2, wherein the first differential drive signal has a first amplitude, the second differential drive signal has a second amplitude, and wherein the first amplitude is different from the second amplitude.

5. The processing system of claim 1, wherein applying the first differential drive signal comprises substantially simultaneously driving a first end of the transmitter electrode with a first drive signal having a first polarity and driving a second end of the transmitter electrode with a second drive signal having a second polarity, and wherein the first polarity is different from the second polarity.

6. The processing system of claim 1, wherein the first drive signal is mathematically independent of the second drive signal.

7. A capacitive sensor device comprising:
a transmitter electrode;
a conductive trace coupled to the transmitter electrode;
a receiver electrode; and
a processing system communicatively coupled to the transmitter electrode and the receiver electrode, the processing system configured to:
apply a first differential drive signal across the transmitter electrode to produce a first voltage variation across the transmitter electrode;
receive with the receiver electrode a first resulting signal when the first voltage variation is produced across the transmitter electrode; and
determine at least one of a resistance of the transmitter electrode and a resistance of the conductive trace based on the first resulting signal;
wherein applying the first differential drive signal comprises substantially simultaneously driving a first end of the transmitter electrode with a first drive signal and driving a second end of the transmitter electrode with a second drive signal.

8. The capacitive sensor device of claim 7, wherein the processing system is further configured to apply a second differential drive signal across the transmitter electrode to produce a second voltage variation,
receive with the receiver electrode a second resulting signal when the second voltage variation is produced across the transmitter electrode, and
determine at least one of a resistance of the transmitter electrode and a resistance of the conductive trace coupled to the transmitter electrode based on the second resulting signal.

9. The capacitive sensor device of claim 8, the processing system further configured to:
apply a third differential drive signal across the transmitter electrode to produce a third voltage variation across the transmitter electrode,
receive a third resulting signal when the third voltage variation is produced across the transmitter electrode, and
determine at least one of the resistance of the transmitter electrode and the resistance of the conductive trace coupled to the transmitter electrode based on the third resulting signal.

10. The capacitive sensor device of claim 8, wherein the first differential drive signal has a first amplitude, the second differential drive signal has a second amplitude, and wherein the first amplitude is different from the second amplitude.

11. The capacitive sensor device of claim 7, wherein the first drive signal has a first polarity and the second drive signal has a second polarity, and wherein the first polarity is different from the second polarity.

12. The capacitive sensor device of claim 7, wherein applying the first differential drive signal comprises substantially simultaneously driving a first end of the transmitter electrode with a first drive signal and driving a second end of the transmitter electrode with a substantially constant voltage.

13. The capacitive sensor device of claim 7, wherein applying the first differential drive signal comprises:
substantially simultaneously driving a first end of the transmitter electrode with a first drive signal and driving a second end of the transmitter electrode with a second drive signal, wherein the first drive signal is substantially orthogonal to the second drive signal.

14. A method of determining resistances in an input device having a transmitter electrode and a conductive trace coupled thereto, the method comprising:
applying a first differential drive signals across the transmitter electrode to produce a first voltage variation across the transmitter electrode;
receiving with a receive electrode a first resulting signal comprising effects of the first voltage variation when the first voltage variation is produced across the transmitter electrode; and
determining at least one of a resistance of the transmitter electrode and a resistance of the conductive trace based on the first resulting signal;
wherein applying the first differential drive signal comprises substantially simultaneously driving a first end of the transmitter electrode with a first drive signal and driving a second end of the transmitter electrode with a second drive signal.

15. The method of claim 14, further comprising:
applying a second differential drive signal across the transmitter electrode to produce a second voltage variation across the transmitter electrode;
receiving a second resulting signal when the second voltage variation is produced across the transmitter electrode; and
determining at least one of the resistance of the transmitter electrode and the resistance of the conductive trace coupled to the transmitter electrode based on the second resulting signal.

16. The method of claim 15, further comprising:
applying a third differential drive signal across the transmitter electrode to produce a third voltage variation across the transmitter electrode;
receiving a third resulting signal when the third voltage variation is produced across the transmitter electrode; and
determining at least one of the resistance of the transmitter electrode and the resistance of the conductive trace coupled to the transmitter electrode based on the third resulting signal.

17. The method of claim 15, wherein the first differential drive signal has a first amplitude, the second differential drive signal has a second amplitude, and wherein the first amplitude is different from the second amplitude.

18. The method of claim 14, wherein the first drive signal has a first polarity and the second drive signal has a second polarity, and wherein the first polarity is different from the second polarity.

19. The method of claim 14, wherein applying the first differential drive signal comprises substantially simultaneously driving a first end of the transmitter electrode with a first drive signal and driving a second end of the transmitter electrode with a substantially constant voltage.

20. The method of claim 14, wherein applying the first differential drive signal comprises:
substantially simultaneously driving a first end of the transmitter electrode with a first drive signal and driving a second end of the transmitter electrode with a second drive signal, wherein the first drive signal is substantially orthogonal to the second drive signal.

* * * * *